No. 678,665.  
J. W. HILLAND.  
EXPANSIBLE PULLEY.  
(Application filed Oct. 30, 1900.)  
Patented July 16, 1901.
(No Model.)
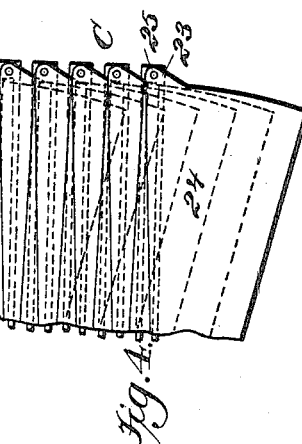
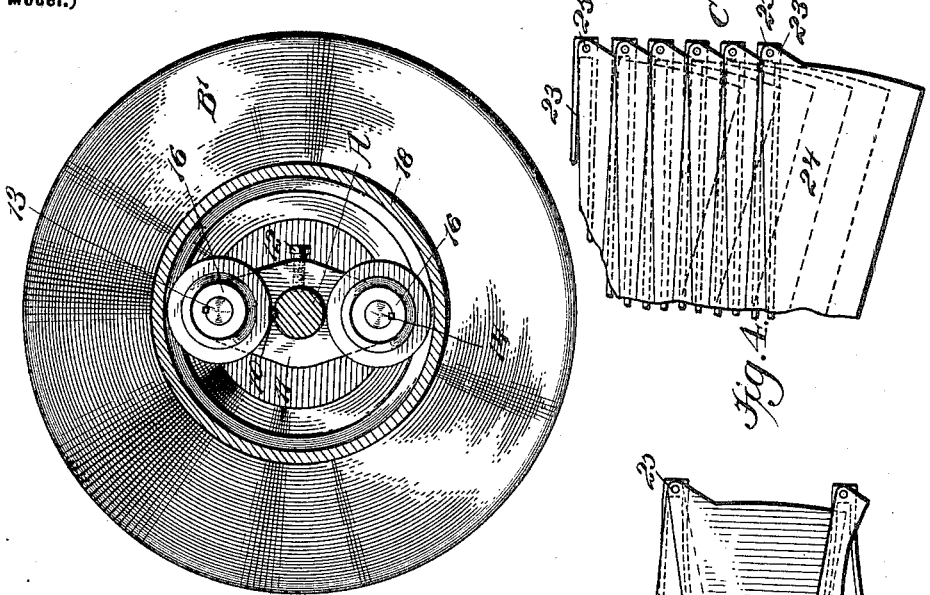
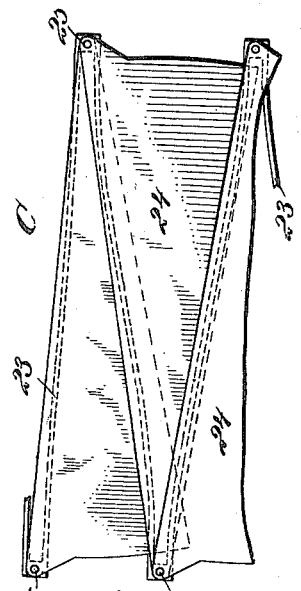
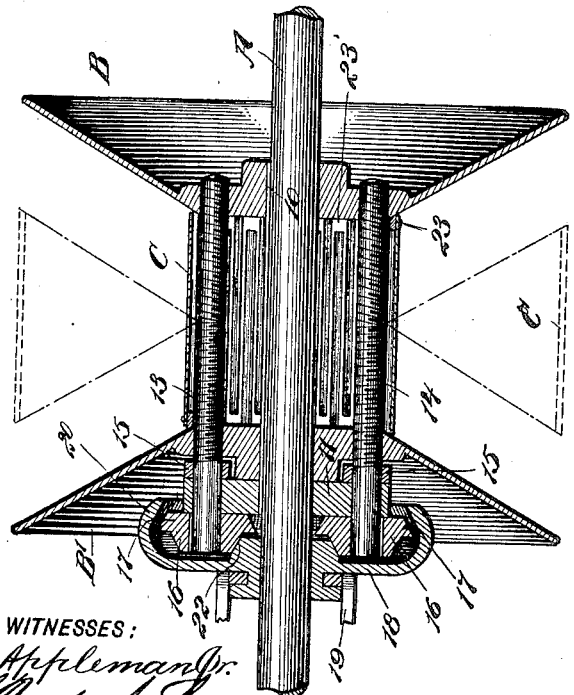
WITNESSES:
INVENTOR  
John W. Hilland  
BY  
ATTORNEYS

UNITED STATES PATENT OFFICE.

JOHN W. HILLAND, OF NEW YORK, N. Y.

EXPANSIBLE PULLEY.

SPECIFICATION forming part of Letters Patent No. 678,665, dated July 16, 1901.

Application filed October 30, 1900. Serial No. 34,924. (No model.)

*To all whom it may concern:*

Be it known that I, JOHN W. HILLAND, a subject of the King of Sweden and Norway, and a resident of the city of New York, borough of Manhattan, in the county and State of New York, have invented a new and Improved Expansible Pulley, of which the following is a full, clear, and exact description.

The purpose of the invention is to construct a simple form of expansible pulley and means practically constituting a portion of the pulley whereby the driving-face of the pulley may be quickly and expeditiously increased or decreased in diameter, thus obtaining variable motion.

The invention consists in the novel construction and combination of the several parts, as will be hereinafter fully set forth, and pointed out in the claims.
Reference is to be had to the accompanying drawings, forming a part of this specification, in which similar characters of reference indicate corresponding parts in all the figures.

Figure 1 is a vertical longitudinal section through the improved pulley, illustrating the driving-face of the pulley as in its smallest diameter. Fig. 2 is a section taken virtually through the shifting mechanism for the pulley and illustrating the pulley proper in end view. Fig. 3 is a plan view of a portion of the driving-face of the pulley, illustrating the parts of said face which are collapsible as expanded or opened out; and Fig. 4 is a view similar to Fig. 3, illustrating a portion of the driving-face of the pulley contracted.

A represents a drive-shaft, and upon this drive-shaft the opposing heads B and B' of the pulley are secured by a feather 10 or the equivalent thereof. These heads are conical or truncated, their inner faces being inclined, as is best shown in Fig. 1.

A yoke 11 is secured upon the shaft 10, adjacent to the outer face of the head B' of the pulley, and this yoke is usually attached to the shaft by means of a set-screw 12 or like device, as is shown in Fig. 2. Two screws 13 and 14, both of which are provided with right and left hand threads, as shown in Fig. 1, are loosely passed through the end portions of the yoke 11, through washers 15, and through correspondingly-threaded apertures in the heads B and B' of the pulley, so that as the screws 13 and 14 are turned in one or the other direction the heads B and B' of the pulley will be carried either in direction of each other or away from each other.

Friction-wheels 16 are secured upon the plain end portions of the set-screws 13 and 14, and these wheels are provided with conical exterior surfaces at their hub portions and with a peripheral flange at the inner portion of their hubs, the outer faces 17 of the said flanges being more or less inclined, as is clearly shown in Fig. 1. In connection with these friction-wheels 16 a shifting device is employed. This shifting device consists of a disk 18, loosely mounted on the shaft A and connecting with a shifting-lever 19, the shifting device or disk 18 being adapted for movement to and from the said friction-wheels 16. This disk or shifting device 18 is provided with an inwardly-curved flange 20, and in one position of the disk this flange 20 is adapted to engage with the beveled faces 17 of the flanges on the friction-wheel 16 and cause these wheels to turn in one direction. The hub portion of the disk is provided with an inclined peripheral surface 22, adapted for engagement with the inclined outer faces of the friction-wheels 16 to turn them in an opposite direction, and when the hub portion of the disk is in engagement with one portion of the friction-wheels the disk is out of engagement with the opposing frictional faces of the wheels, as is shown in Fig. 1. The disk 18 does not turn, but slides loosely upon the shaft A, and to that end the disk is slidably connected with a nearby fixed bracket or support. Therefore while the pulley is revolving if the disk is moved in engagement with one or the other of the contact-faces of the friction-wheel 16 the screws 13 and 14 will be turned in a direction to either draw the heads of the pulley together or carry said heads away from each other. When the hub portion of the disk or shifting device 18 is in engagement with the friction-wheels 16, the screws 13 and 14 are turned in a manner to carry the heads B and B' of the pulley apart; but when the flange-section 20 of said disk engages with the friction-wheels 16 the heads of the pulley are brought together. When the disk 18 is in engagement with the friction-wheels, said wheels will be revolved by reason of frictional contact with the disk and also by reason of the main portion of the pulley revolving, which portion carries the wheels.

The driving-face C of the pulley is preferably made of metal, although other material may be employed, and in the construction of this driving-face a frame is employed which consists of a frame formed by a bar 23, rod, or the like, returned upon itself in a manner to form a series of members at angles to each other. Plates 24, which are more or less triangular, are pivoted at 25 to the members of the rod or bar 23 at the end portions of said members, as shown in Figs. 3 and 4. These plates overlap, so that when the frame formed by the rod or bar 23 is operated upon in a manner to bring its members closer together or farther apart the driving-face C of the pulley will be increased in diameter or decreased. When the heads B and B' of the pulley are drawn together, the driving-face C of the pulley will be increased in diameter, as the leaves or plates 24 will be crowded up the inclined planes at the inner faces of the said heads and will occupy a position substantially like that shown in dotted lines in Fig. 1. As the heads B and B' are forced apart, the leaves of the driving-face C of the pulley will be drawn by the belt down the inner inclined faces of the heads B and B', and when said heads have been separated to their greatest extent the driving-face of the pulley will be near to the screws 13 and 14, and the said driving-face of the pulley will then have its least diameter.

Having thus described my invention, I claim as new and desire to secure by Letters Patent—

1. A pulley comprising heads having oppositely-inclined inner faces, said heads being movable toward and from each other, means substantially as described for causing such movements, and a collapsible driving-face for the pulley engaging with the inclined inner faces of the heads and movable to enlarged diameter by the movement of the heads toward each other.

2. A pulley, comprising heads, movable toward and from each other, said heads having oppositely-inclined opposing faces, a right and left hand screw connection between the heads, friction-wheels carried by the screw having oppositely-inclined contact-surfaces of different diameter, a sliding member having contact-faces adapted for engagement with either one or the other of the contact-surfaces of the friction-wheels, and a collapsible driving-face for the pulley movable to enlarged diameter by the movement of the heads toward each other and movable to a smaller diameter by belt-pressure.

3. An expansible pulley, consisting of truncated heads capable of movement to and from each other, right and left hand threaded adjusting-screws passed through the said heads, means for turning the said screws to the right or to the left, which means constitutes a portion of the pulley, and a collapsible driving-face for the pulley, located between its heads and disconnected from said heads, as described.

4. An expansible pulley, consisting of truncated heads adapted to be mounted on a shaft and to have sliding movement on the shaft, screws having right and left hand threads passed through the said heads, friction-pulleys secured on the said screws and provided with two independent exterior beveled faces, a disk adapted to slide upon the support for the pulley and to be loosely mounted on said support, which disk is provided with two contact-faces adapted for engagement with the respective beveled faces of the friction-wheels, and a collapsible driving-face for the pulley, located between the heads of the pulley and disconnected from said heads, for the purpose set forth.

5. In an expansible pulley, the combination, with a shaft, truncated heads mounted to slide and to turn therewith, the inner faces of the heads being inclined, a yoke secured to the said shaft, screws loosely passed through the yoke, which screws have right and left hand threads entering correspondingly-threaded recesses in the heads of the pulley, and friction-wheels secured upon the outer ends of the said screws, which friction-wheels have exterior beveled body-faces and reversely-beveled flange-faces, of a shifting device consisting of a disk loosely mounted on the shaft, having an inclined hub-section for engagement with the beveled body portions of said friction-wheels and a flange-section for engagement with the beveled flange-surfaces of said friction-wheels, and an expansible driving-face for the pulley, consisting of a bar-frame comprising a series of members at angles to each other and leaves pivoted at the end portions of said members, said driving-face of the pulley being located between the heads of the pulley yet disconnected from said heads, as specified.

In testimony whereof I have signed my name to this specification in the presence of two subscribing witnesses.

JOHN W. HILLAND.

Witnesses:
J. FRED. ACKER,
JNO. M. RITTER.